United States Patent
Gomez et al.

(10) Patent No.: US 7,034,632 B2
(45) Date of Patent: Apr. 25, 2006

(54) MULTI-TUNER RECEIVERS WITH CROSS TALK REDUCTION

(75) Inventors: Ramon A. Gomez, San Juan Capistrano, CA (US); Chin Kuok Yong, Singapore (SG)

(73) Assignee: Broadcom Corporation, Irvine, CA (US)

(*) Notice: Subject to any disclaimer, the term of this patent is extended or adjusted under 35 U.S.C. 154(b) by 0 days.

(21) Appl. No.: 10/843,565

(22) Filed: May 12, 2004

(65) Prior Publication Data

US 2005/0253663 A1 Nov. 17, 2005

(51) Int. Cl.
*H03H 7/46* (2006.01)

(52) U.S. Cl. .............. 333/110; 333/126; 333/129; 333/132

(58) Field of Classification Search .......... 333/100, 333/110, 126, 129, 132

See application file for complete search history.

(56) References Cited

U.S. PATENT DOCUMENTS

| 5,291,125 | A | * | 3/1994 | Tsui et al. | 324/76.22 |
| 5,953,429 | A | * | 9/1999 | Wakai et al. | 381/77 |
| 6,504,867 | B1 | * | 1/2003 | Efstathiou | 375/227 |
| 6,819,274 | B1 | * | 11/2004 | Krone et al. | 341/141 |

* cited by examiner

*Primary Examiner*—Robert Pascal
*Assistant Examiner*—Kimberly E. Glenn
(74) *Attorney, Agent, or Firm*—Sterne, Kessler, Goldstein & Fox, P.L.L.C.

(57) ABSTRACT

Multi-tuner receivers with cross talk reduction are disclosed. In one embodiment, a multi-tuner receiver with cross talk reduction includes a low noise amplifier, a set of interstage filters and a set of corresponding tuners. In an alternative embodiment, a multi-tuner receiver with cross talk reduction includes a passive splitter, a set of interstage filters and a set of corresponding tuners. The interstage filters can be low-pass, high-pass or band-pass filters depending on the particular frequency range of interest. Typical embodiments can have two or three tuners, however, the invention applies to multi-receiver tuners with more than three tuners. The multi-tuner receivers can be used within television, cable set top boxes and other devices that receive multiple video signals.

8 Claims, 4 Drawing Sheets

MULTI-TUNER RECEIVERS WITH CROSS TALK REDUCTION

BACKGROUND OF THE INVENTION

1. Field of the Invention

The present invention relates to video receivers, and more particularly, to multi-tuner receivers with cross talk reduction.

2. Background of the Invention

Increasingly, televisions and cable set top boxes for receiving cable television and satellite signals, including broadcast programming and Internet services, can provide the ability to receive multiple channels simultaneously. This capability permits features such as simultaneous television and Internet service, picture-in-picture displays, and distributing service to multiple rooms in one household.

The set top boxes and televisions for processing multiple channels require multi-tuner receivers, which extract multiple cable or satellite signals. The multi-tuner receivers select the desire channels for demodulation and further signal processing. An architecture for set top boxes or televisions requiring multiple tuners uses a passive splitter to receive and distribute an RF signal to multiple tuners. An alternative architecture for set top boxes or televisions requiring multiple tuners uses a low noise amplifier (LNA) to amplify an incoming RF signal and distribute the signal to multiple tuners. In general, there may be one or multiple outputs for the LNA with each output driving one tuner or multiple tuners in parallel. The LNA architecture avoids loss and reduction in noise figure that results when a passive splitter is used to drive multiple channels.

In either case, one difficulty associated with the use of multi-tuner receivers relates to the leakage of electromagnetic energy among tuners, which is often referred to as cross talk. Various signals generated in one tuner can leak from the tuner input to an LNA output, and from the LNA output to another tuner input. Such leakage can result in undesired levels of spurious signals at the output of the second tuner. This type of cross talk can also occur in a multi-tuner system using a passive splitter at the front end, since passive splitters also have finite isolation.

What is needed is a cost-effective multi-tuner receiver with cross talk reduction.

SUMMARY OF THE INVENTION

The invention discloses multi-tuner receivers with cross talk reduction. In one embodiment, a multi-tuner receiver with cross talk reduction includes a low noise amplifier, a set of interstage filters and a set of corresponding tuners. In an alternative embodiment, a multi-tuner receiver with cross talk reduction includes a passive splitter, a set of interstage filters and a set of corresponding tuners. The interstage filters reduce the electromagnetic leakage among tuners, and can be low-pass, high-pass or band pass filters depending on the particular frequency range of interest. Typical embodiments can have two or three tuners, however, the invention applies to multi-tuner receivers with more than three tuners, as well. The multi-tuner receivers can be used within televisions, cable set top boxes and other devices that receive multiple video signals.

Use of the invention can greatly reduce electromagnetic energy leakage among tuners in a multi-tuner receiver. The reduction in leakage, referred to as cross talk, can greatly increase the quality of the output signals in a multi-tuner receiver.

Further embodiments, features, and advantages of the invention, as well as the structure and operation of the various embodiments of the invention are described in detail below with reference to accompanying drawings.

BRIEF DESCRIPTION OF THE FIGURES

The invention is described with reference to the accompanying drawings. In the drawings, like reference numbers indicate identical or functionally similar elements. The drawing in which an element first appears is indicated by the left-most digit in the corresponding reference number.

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Figure 1:
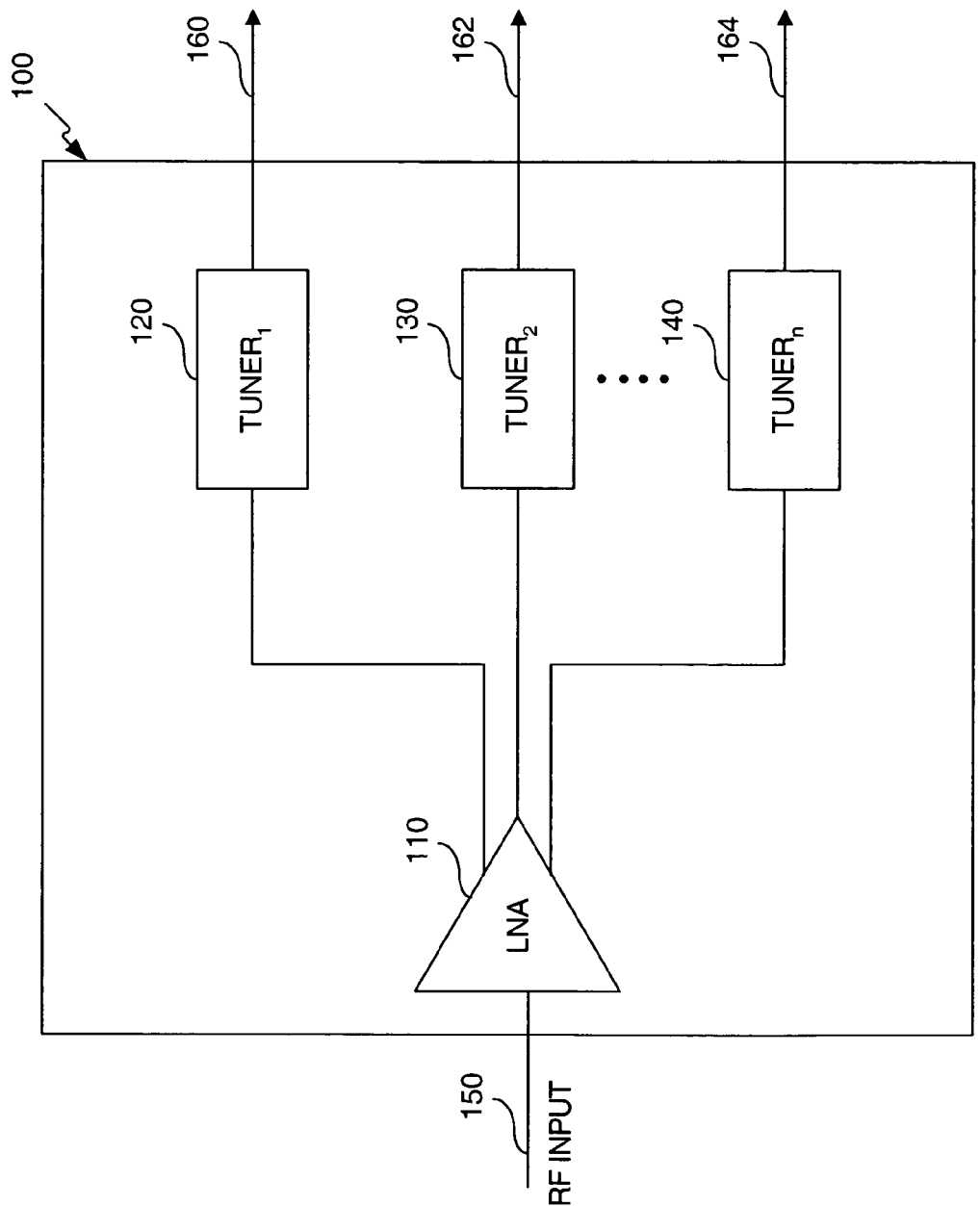
FIG. 1 is a diagram of a multi-tuner receiver with a low noise amplifier.

FIG. 1 is a diagram of multi-tuner receiver 100 with a low noise amplifier. Multi-tuner receiver 100 includes low noise amplifier 110 and a set of tuners represented by tuners 120, 130 and 140. The number of tuners can range from two to several hundred. Typically, the number of tuners is either two or three in current television or cable set top boxes. Low noise amplifier 110 receives an RF input, such as RF input 150. The output of low noise amplifier 110 is coupled to each of the inputs of tuners 120, 130, and 140. The output of tuners 120, 130 and 140 are transmitted out of multi-tuner receiver 100, typically to demodulators.

Low noise amplifier 110 receives and amplifies an RF input signal. Typically, the RF input signal can include a set of television channels in the frequency range of 50 to 860 Mhz. Low noise amplifier 110 functions also as a splitter, and distributes the incoming RF signal to each of tuners 120, 130, and 140. A tuner, such as tuner 120, 130 and 140, extracts the video and audio signal for the desired channel. For example, a program transmitted on channel 2 has a video carrier at 55.25 Mhz and an audio carrier at 59.75 Mhz. Thus, when an viewer wants to view channel 2, a tuner would extract the frequencies associated with channel 2.

Multi-tuner receiver 100 has the ability to extract three different channels at a given time. Each of tuners 120, 130 and 140 will extract a single channel. So, for example, if a user wanted to view a picture in a picture, tuner 120 can be set to channel 2 and tuner 130 can be set to channel 3 to display two pictures. In this case, tuner 140 would not be used. As discussed in the background section, a problem with this type of receiver is interference between tuners 120, 130 and 140 due to leakage of electromagnetic energy that occurs among the tuners.

Figure 2:
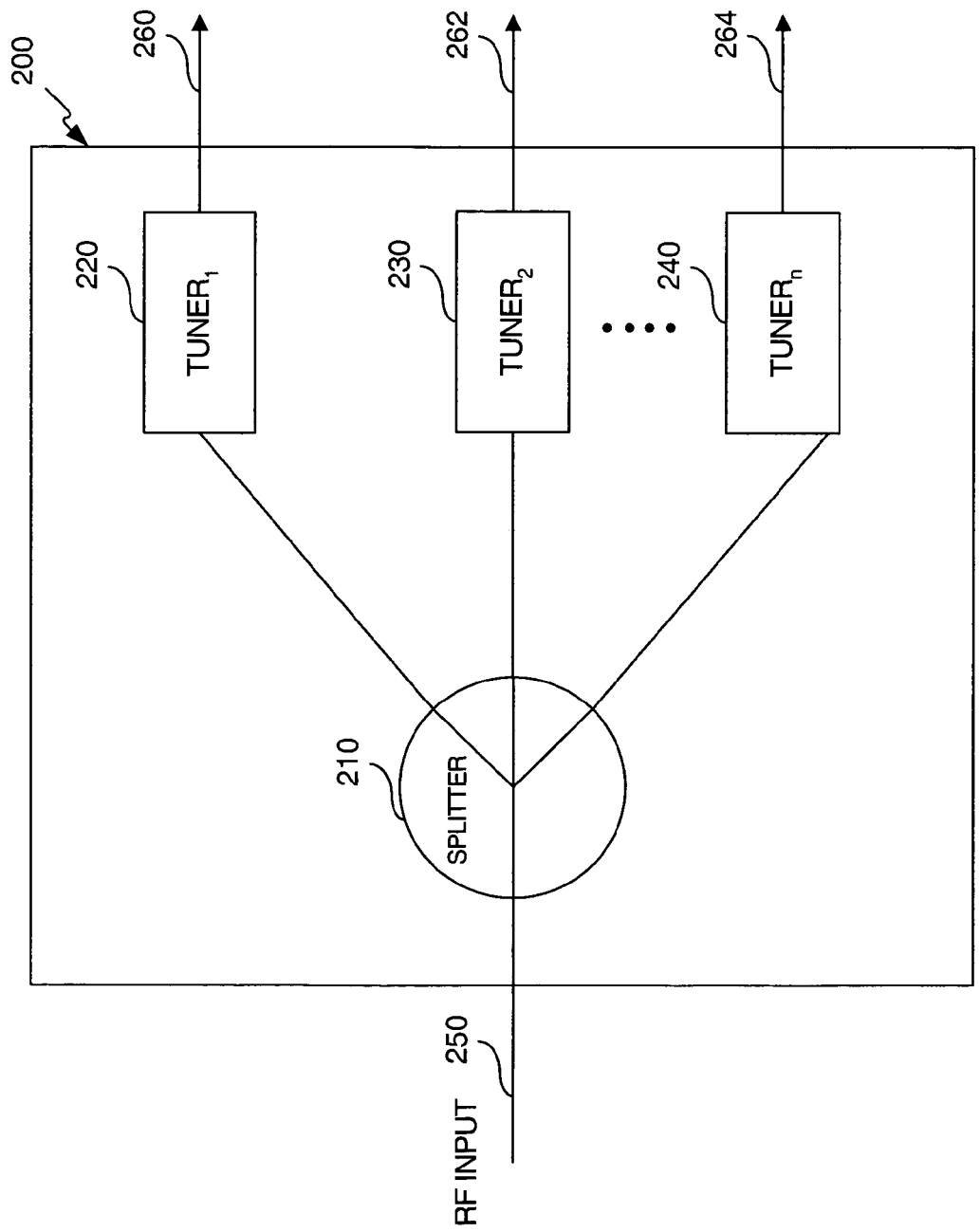
FIG. 2 is a diagram of a multi-tuner receiver with a splitter.

FIG. 2 is a diagram of multi-tuner receiver 200 with a low noise amplifier. Multi-tuner receiver 200 includes splitter 210 and a set of tuners represented by tuners 220, 230 and 240. Multi-tuner receiver 200 is the same as multi-tuner receiver 100, except that a splitter is used instead of a low noise amplifier to distribute the incoming RF input signal. As in the case of multi-tuner receiver 100, the number of tuners can range from two to several hundred. Typically, the number of tuners is either two or three in current television or cable set top boxes.

Splitter 210 receives an RF input, such as RF input 250. The output of splitter 210 is coupled to each of the inputs of tuners 220, 230, and 240. The output of tuners 220, 230 and 240 are transmitted out of multi-tuner receiver 200, typically to demodulators.

Splitter 210 receives and distributes an RF input signal. Typically, the RF input signal can include a set of television channels in the frequency range of 50 to 860 Mhz. In this example, splitter 210 distributes the incoming RF signal 250 to each of tuners 220, 230, and 240.

Multi-tuner receiver 200 has the ability to extract three different channels at a given time. Each of tuners 220, 230 and 240 will extract a single channel. So, for example, as in the case of multi-tuner receiver 100 if a user wanted to view a picture in a picture, tuner 220 can be set to channel 2 and tuner 230 can be set to channel 3 to display two pictures. In this case, tuner 240 would not be used. As discussed in the background section and with respect to multi-tuner receiver 100, a problem with this type of receiver is interference between tuners 220, 230 and 240 due to leakage of electromagnetic energy that occurs among the tuners.

Figure 3:
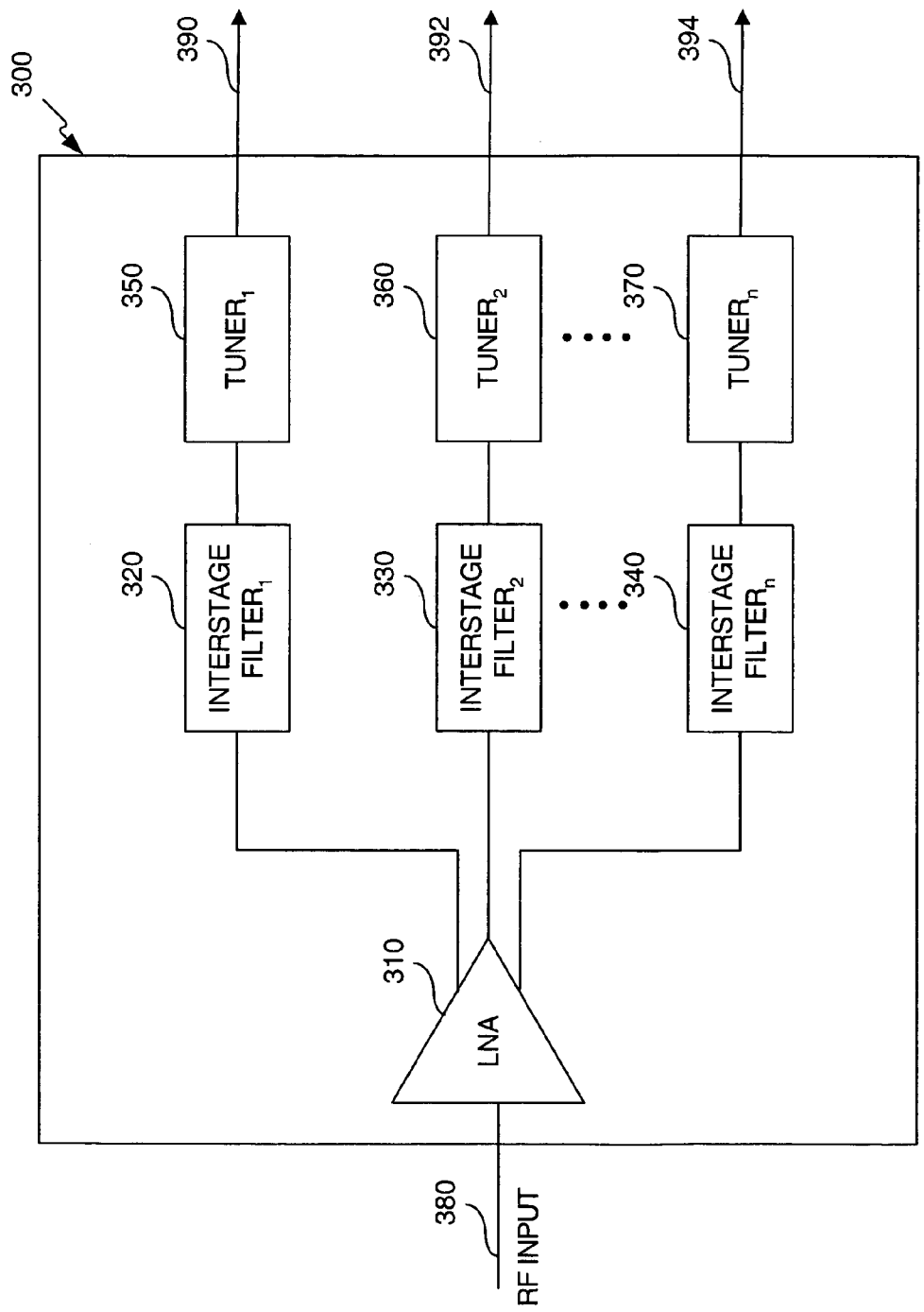
FIG. 3 is a diagram of a multi-tuner receiver with a low noise amplifier, according to an embodiment of the invention.

FIG. 3 is a diagram of multi-tuner receiver 300 with a low noise amplifier, according to an embodiment of the present invention. Multi-tuner receiver 300 includes low noise amplifier 310; a set of interstage filters represented by interstage filters 320, 330 and 340; and a set of tuners represented by tuners 350, 360 and 370. Multi-tuner receiver 300 addresses interference problems that were discussed with reference to multi-tuner receiver 100. As in the case of multi-tuner receiver 100, the number of tuners can range from two to several hundred. Typically, the number of tuners is either two or three in current television or cable set top boxes. In an embodiment, for each tuner there will be a corresponding interstage filter.

Low noise amplifier 310 receives an RF input, such as RF input 380. The output of low noise amplifier 310 is coupled to each of the inputs of interstage filters 320, 330 and 340. The outputs of interstage filters 320, 330 and 340 are coupled to the inputs of corresponding tuners. For example, interstage filter 320 is coupled to tuner 350, interstage filter 330 is coupled to tuner 360 and interstage filter 340 is coupled to tuner 370. The outputs from tuners 350, 360 and 370 are transmitted out of multi-tuner receiver 300, typically to demodulators.

Low noise amplifier 310 receives, amplifies and distributes an RF input signal. Typically, the RF input signal can include a set of television channels in the frequency range of 50 to 860 Mhz. In this example, low noise amplifier 310 distributes the incoming RF signal 380 to each of interstage filters 320, 330, and 340.

As in the case of the previous receivers discussed, multi-tuner receiver 300 has the ability to extract three different channels at a given time. Each of tuners 350, 360, and 370 will extract a video signal centered at a particular frequency. So, for example, if a user wanted to view a picture in a picture, tuner 350 can be set to the frequency for channel 2 and tuner 360 can be set to the frequency for channel 3 to display two pictures. In this case, tuner 370 would not be used. As discussed in the background section and with respect to multi-tuner receiver 100, a problem with this type of receiver is interference between tuners 220, 230 and 240 due to leakage of electromagnetic energy that occurs among the tuners.

Interstage filters 350, 360 and 370 address this problem by reducing leakage of electromagnetic energy, such as crosstalk among the tuners by eliminating frequencies outside the frequency ranges of interest. The filters can be either low pass, band pass or high pass depending on the type of signal that is desired. For example, in one embodiment interstage filters 320 and 330 can be low pass interstage filters that pass signals up to a frequency of 860 Mhz, while interstage filter 340 can be a narrowband interstage filter with a center frequency in the range of 70–200 Mhz. In this embodiment, tuners 350 and 360 can be used to extract cable television video signals, while tuner 370 can be used to extract programming and control information from the control or out-of-band channel.

Figure 4:
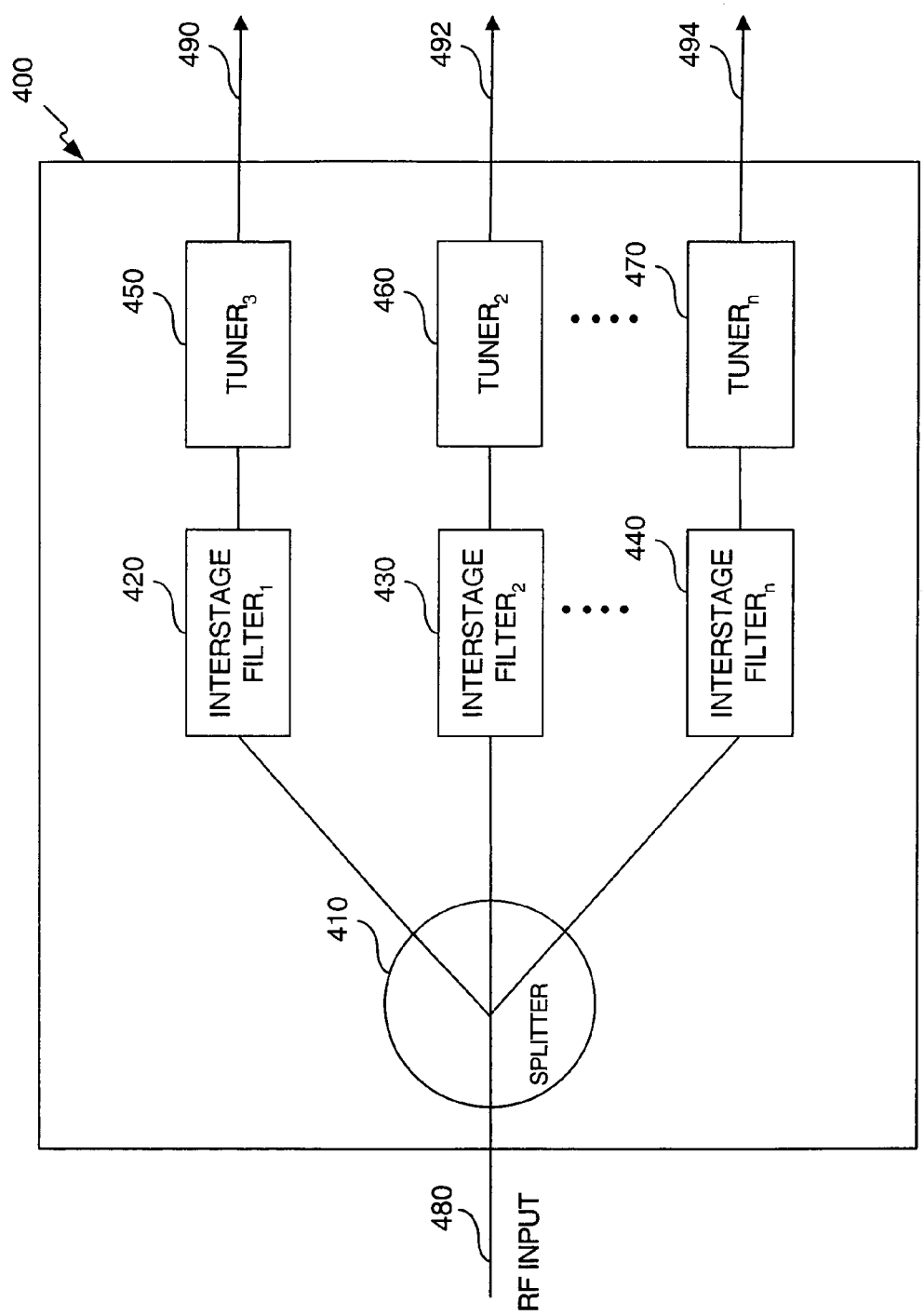
FIG. 4 is a diagram of a multi-tuner receiver with a splitter, according to an embodiment of the invention.

FIG. 4 is a diagram of multi-tuner receiver 400 with a splitter, according to an embodiment of the invention. Multi-tuner receiver 400 includes splitter 410; a set of interstage filters represented by interstage filters 420, 430 and 440; and a set of tuners represented by tuners 450, 460 and 470. Multi-tuner receiver 400 addresses interference problems associated with multi-tuner receiver 200. As in the case of multi-tuner receiver 200, the number of tuners can range from two to several hundred. Typically, the number of tuners is either two or three in current television or cable set top boxes. In an embodiment, for each tuner there will be a corresponding interstage filter.

Splitter 410 receives an RF input, such as RF input 480. The output of low noise amplifier 410 is coupled to each of the inputs of interstage filters 420, 430 and 440. The outputs of interstage filters 420, 430 and 440 are coupled to the inputs of corresponding tuners. For example, interstage filter 420 is coupled to tuner 450, interstage filter 430 is coupled to tuner 460 and interstage filter 440 is coupled to tuner 470. Tuners 450, 460 and 470 are transmitted out of multi-tuner receiver 400, typically to demodulators.

Splitter 410 receives and distributes an RF input signal. Typically, the RF input signal can include a set of television channels in the frequency range of 50 to 860 Mhz. In this example, splitter 410 distributes the incoming RF signal 480 to each of interstage filters 420, 430, and 440.

As in the case of the previous receivers discussed, multi-tuner receiver 400 has the ability to extract three different channels at a given time. Each tuner, such as tuner 450, 460 and 470 will extract a single channel. So, for example, if a user wanted to view a picture in a picture, tuner 450 can be set to the frequency for channel 2 and tuner 360 can be set to the frequency for channel 3 to display two pictures. In this case, tuner 470 would not be used. As discussed in the background section and with respect to multi-tuner receiver 200, a problem with this type of receiver is interference between tuners 420, 430 and 440 due to leakage of electromagnetic energy that occurs within the tuners.

Interstage filters 450, 460 and 470 reduce leakage of electromagnetic energy, such as crosstalk among the tuners by eliminating frequencies outside the frequency ranges of interest. The filters can be either low pass, band pass or high pass depending on the type of signal that is desired. For example, in one embodiment interstage filters 420 and 430 can be low pass interstage filters that pass signals up to a frequency of 860 Mhz, while interstage filter 440 can be a narrowband interstage filter with a center frequency in the range of 70–200 Mhz. In this embodiment, tuners 450 and 460 can be used to extract cable television video signals, while tuner 470 can be used to extract programming and control information from the control or out-of-band channel.

Exemplary embodiments of digital headend conversion systems and methods that can be used to upconvert the frequency of a received digital television baseband signal to produce an RF multi-channel television spectrum for distribution. The present invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the present invention.

What is claimed is:

1. A multi-tuner receiver within a video device, comprising:
    a low noise amplifier for receiving and distributing an RF input signal,
    a plurality of interstage filters for reducing crosstalk interference, wherein each interstage filter within said plurality of interstage filters is coupled to said low noise amplifier, wherein said plurality of interstage filters includes:
        a first interstage filter, wherein said first interstage filter is a low pass interstage filter for passing signals up to a first frequency;
        a second interstage filter, wherein said second interstage filter is a low pass interstage filter for passing signals up to a second frequency; and
        a third interstage filter, wherein said third interstage filter is a narrowband interstage filter centered at a third frequency, and
    a plurality of tuners for extracting a frequency band within the RF input signal, wherein each tuner within said plurality of tuners is coupled to one of said plurality of interstage filters.

2. The multi-tuner receiver of claim 1, wherein said first frequency is 860 Mhz, said second frequency is 860 Mhz and said third frequency is in a range between 70 and 200 Mhz.

3. The multi-tuner receiver of claim 1, wherein said video device is a cable set top box.

4. The multi-tuner receiver of claim 1, wherein said video device is a television.

5. A multi-tuner receiver within a video device, comprising:
    a splitter for receiving and distributing an RF input signal,
    a plurality of interstage filters for reducing crosstalk interference, wherein each interstage filter within said plurality of interstage filters is coupled to said splitter,
        a first interstage filter, wherein said first interstage filter is a low pass interstage filter for passing signals up to a first frequency;
        a second interstage filter, wherein said second interstage filter is a low pass interstage filter passing signals up to a second frequency; and
        a third interstage filter, wherein said third interstage filter is a narrowband interstage filter centered at a third frequency; and
    a plurality of tuners for extracting a frequency band within the RF input signal, wherein each tuner within said plurality of tuners is coupled to a corresponding interstage filter.

6. The multi-tuner receiver of claim 5, wherein said first frequency is 860 Mhz, said second frequency is 860 Mhz and said third frequency is in range between 70 and 200 Mhz.

7. The multi-tuner receiver of claim 5, wherein said video device is a cable set top box.

8. The multi-tuner system of claim 5, wherein said video device is a television.

* * * * *